United States Patent [19]
Diener et al.

[11] Patent Number: 6,063,954
[45] Date of Patent: May 16, 2000

[54] NON-IONIC EMULSIFIERS

[75] Inventors: Wolfgang Diener; Volker Duecoffre; Carmen Flosbach, all of Wuppertal; Gerhard Hey, Köln; Walter Schubert, Wuppertal, all of Germany

[73] Assignee: Herberts Gesellschaft mit beschränkter Haftung, Wuppertal, Germany

[21] Appl. No.: 09/051,530

[22] PCT Filed: Oct. 26, 1996

[86] PCT No.: PCT/EP96/04675

§ 371 Date: Apr. 10, 1998

§ 102(e) Date: Apr. 10, 1998

[87] PCT Pub. No.: WO97/16242

PCT Pub. Date: May 9, 1997

[30] Foreign Application Priority Data

Oct. 28, 1995 [DE] Germany .............. 195 40 320

[51] Int. Cl.$^7$ .......... C07C 269/02; C07C 271/06; C07C 271/08; C08G 18/42; C08G 18/48
[52] U.S. Cl. .......... 560/26; 252/306; 252/308; 252/311; 252/312; 528/49; 528/74.5; 528/76; 528/77; 560/25; 560/33; 560/115; 560/157; 560/158; 560/166
[58] Field of Search .......... 252/306, 308, 252/311, 312; 524/198, 591, 728, 800; 560/25, 26, 115, 157, 158, 33, 166; 528/49, 74.5, 76, 77

[56] References Cited

U.S. PATENT DOCUMENTS

| | | | |
|---|---|---|---|
| 3,899,454 | 8/1975 | Wagner et al. | 521/159 |
| 4,176,099 | 11/1979 | Pampouchidis et al. | 524/901 |
| 5,200,463 | 4/1993 | Flakus | 524/591 |
| 5,426,138 | 6/1995 | Bederke et al. | 523/415 |

FOREIGN PATENT DOCUMENTS

| | | |
|---|---|---|
| 0 054 869 | 6/1982 | European Pat. Off. . |
| 0 077 909 | 5/1983 | European Pat. Off. . |

OTHER PUBLICATIONS

Paul Becher, *Encyclopedia of Emulsion Technology*, vol. 1 "Basic Theory", pp. 337–367, 1983.

Kozo Shinoda et al., *Emulsions and Solubilization*, pp. 75–83, 1986.

Drew Myers, *Surfactant Science and Technology*, pp. 67–73, 1988.

*Ullmann's Encyclopedia of Industrial Chemistry* (5th Ed. Completely Revised); vol. A9: Dithiocarbamic Acid to Ethanol, pp. 297–339, 1987.

*Primary Examiner*—Rabon Sergent
*Attorney, Agent, or Firm*—Schwegman, Lundberg, Woessner & Kluth, P.A.

[57] ABSTRACT

This invention relates to non-ionic emulsifiers based on fatty acid esters of polyalkoxylated polyhydric alcohols as fundamental constituents. At least two fundamental constituents are linked to each other by the reaction of hydroxyl groups with a polyisocyanate, with the formation of urethane bonds.

7 Claims, No Drawings

NON-IONIC EMULSIFIERS

This invention relates to non-ionic emulsifiers based on fatty acid esters of polyalkoxylated polyhydric alcohols as fundamental constituents, and to the production and use thereof.

Non-ionic emulsifiers for the stabilisation of disperse systems have already been known for a long time in the literature. Apart from fatty alcohol- and alkylphenol alkoxylates of linear structure, emulsifiers are known which are based on polyhydric alcohols esterified with fatty acids, such as glycerol, pentaerythritol, sorbitol and secondary products thereof (e.g. sorbitan and its isomers; see HOUBEN-WEYL), and which are characterised in that stable emulsions can be produced using smaller amounts of emulsifier than when the linear types are used. The fatty acids in these emulsifiers may be saturated or unsaturated. Examples include palmitic acid, stearic acid, lauric acid, linoleic or linolenic acid, and dehydrated castor acid. Alkoxylation is effected by ethylene oxide and/or propylene oxide. The degree of alkoxylation is between 10 and 100. Examples of alkoxylated fatty acid esters of polyhydric alcohols include the polyethoxylated sorbitan fatty acid esters which are commercially available under the trade name TWEEN (a trade name of ICI). Their synthesis and production are described in:

Paul Becher: Encyclopedia of Emulsion Technology Vol. 1 page 337 et seq. M. Dekker Inc. New York, Basle, 1983

Kozo Shinoda & Stig Friberg: Emulsion & Solubilisation page 74 et seq. John Wiley & Son, 1986

Drew Myers: Surfactant Science and Technology page 67 et seq. VCH Publishers, Inc. 1988

Dr. R. Reusch in: Ullmann Enzyklopädie der technischen Chemie Volume 10, pages 449–473 Verlag Chemie, Weinheim, 1975

Dr. M. Quadvlieg: "Emulgieren, Emulgatoren" in HOUBEN-WEYL: "Methoden der organischen Chemie" page 97 et seq. Vol. I/2, Thieme-Verlag, Stuttgart 4th Edition, 1959, and in U.S. Pat. No. 3,647,477

U.S. Pat. No. 2,374,931

U.S. Pat. No. 2,380,166.

Ethoxylation can be effected by the reaction of OH-functional fundamental substances (fatty acids, fatty alcohols, polyhydric alcohols and secondary products thereof, such as sorbitan, for example) with polyalkylene oxides such as polyethylene oxide for example, or by the polyalkoxylation of the aforementioned fundamental substances with ethylene oxide and/or propylene oxide with basic catalysis and under pressure.

Examples of ethoxylated sorbitan fatty acid esters include the commercial products TWEEN 20 (sorbitan monolaurate comprising 20 moles ethylene oxide) and Atlas G-4252 comprising 80 moles ethylene oxide. Emulsifiers such as these are hereinafter called fundamental constituents, from which the emulsifiers according to the invention are synthesised.

A disadvantage of these emulsifiers during the production of synthetic resin emulsions for the formulation of lacquers, particularly covering lacquers, is the large amount thereof which has to be used, which results in a drastic impairment of the resistance to weathering and of other lacquer technology parameters. It has now been shown that these disadvantages can be substantially eliminated by increasing the molecular weight by linking the fundamental constituents. Thus an emulsifier is obtainable under the trade name "G1350" (ICI) which is based on ethoxylated sorbitan fatty acid esters and in which the fundamental constituents are built up to form structures of higher molecular weight by reaction with phthalic anhydride, and which has a weight average molecular weight Mw of 17,000. Stable emulsions are obtained here even when amounts of 3% are used with respect to the phase to be emulsified, whereas when the corresponding fundamental constituents are used at least 10–20% is required with respect to the phase to be emulsified. A disadvantage of this emulsifier is the tendency of the lacquer film towards yellowing, due to its chemical structure, and its tendency to form strongly structured surface. The latter disadvantage is particularly troublesome for covering lacquers and severely restricts the use of these emulsifiers for this application. Moreover, covering lacquers which contain this emulsifier are very sensitive to hydrolysis.

The object of the present invention is therefore to provide emulsifiers which do not exhibit these disadvantages and which also enable very smooth surfaces to be produced, with a good state of the covering lacquer.

This object is achieved by non-ionic emulsifiers of the type cited at the outset, which are characterised in that at least two fundamental constituents are linked to each other by the reaction of hydroxyl groups with a polyisocyanate, with the formation of urethane bonds. Advantageous forms of these emulsifiers are given in the subsidiary claims.

The preferred polyalkylene oxides are polyoxyethylene (POE) and polyoxypropylene (POP) or block copolymers of POE and POP. The degree of alkoxylation is between 25 and 300, preferably between 30 and 200.

The fatty acids may be of a saturated or unsaturated nature. Their chain length is between $C_6$ and $C_{24}$. Examples thereof include palmitic acid, stearic acid, lauric acid, linoleic and linolenic acids and dehydrated castor acid. Saturated fatty acids are preferably used. Lauric acid is most preferably used.

The core unit of the emulsifiers according to the invention consists of polyols, which may be either linear or branched. The preferred polyols have the general composition $C_nH_{2n+2}O_n$, such as glycerol (n=3), trimethylolpropane, pentaerythritol or sorbitol (n=6), Cyclic condensation products of these polyols, e.g. sorbitan and isomers thereof, are most preferably used. Apart from simple polyols, polymeric polyols such as polyglycerols are also suitable as the hydroxy-functional cores of the emulsifiers according to the invention. The molecular weights of polyols of this type are usually between 92 and 1000.

The preferred fundamental constituents are alkoxylated sorbitan fatty acid esters obtained from saturated fatty acids. The fundamental constituents which are particularly preferred are therefore sorbitan monolaurates which have degrees of alkoxylation from 25 to 300 moles alkylene oxide per mole emulsifier, corresponding to an MW (GPC; polystyrene) of 500 to 14,000.

Their composition corresponds to a molar ratio of sorbitol: lauric acid alkylene oxide=1:1:25–300.

The fundamental constituents are reacted with polyisocyanates in order to increase the molecular weight. Examples of polyisocyanates which can be used according to the invention include cycloaliphatic, aliphatic or aromatic polyisocyanates such as 1,2-propylene diisocyanate, 2,3-butylene diisocyanate, tetramethylene diisocyanate, 1,6-hexamethylene diisocyanate, 2,2,4-trimethylene diisocyanate, 1,12-dodecane diisocyanate, cyclohexane-1,3- and 1,4-diisocyanate, 1-isocyanato-3,3,5-trimethyl-5-isocyanato-methylcyclohexane (=isophorone diisocyanate IPDI), perhydro-2,4'- and/or -4,4'-diphenylmethane diisocyanate, 1,3- and 1,4-phenylene diisocyanate, toluene 2,4- and 2,6-diisocyanate, diphenylmethane 2,4'- and/or -4,4'-disocyanate 3,2'- and/or 3,4-diisocyanato-4-methyldiphenylmethane, naphthylene 1,5-diisocyanate, m-xylylene diisocyanate, p-xylylene diisocyanate, triphenylmethane 4,4'-triisocyanate, tetramethylxylylene diisocyanate, lysine diisocyanate or mixtures of these compounds. Aliphatic and cycloaliphatic polyisocyanates are preferred. Apart from these simple isocyanates, isocyanates are also suitable which contain hetero atoms in the radical which links the isocyanate groups. Examples thereof include polyisocyanates which comprise carbodiimide groups, allophanate groups, isocyanurate groups, urethane groups, acylated urea groups and biuret groups.

The known polyisocyanates which are mainly used for the production of lacquers are also suitable, e.g. modification products of the aforementioned simple polyisocyanates which contain biuret, isocyanurate or urethane groups, particularly tris-(6-isocyanatohexyl)-biuret, as well as isocyanurates of 1,6-hexamethylene- or isophorone diisocyanate, or low molecular weight polyisocyanates which comprise urethane groups, such as those which can be obtained by the reaction of excess IPDI with simple polyhydric alcohols of molecular weight range 62 to 300, particularly with trimethylolpropane. Any mixtures of said polyisocyanates can also of course be used for the production of the emulsifiers according to the invention.

Other suitable polyisocyanates are the known prepolymers comprising terminal isocyanate groups, which can be obtained in particular by the reaction of the aforementioned simple polyisocyanates, particularly diisocyanates, with sub-stoichiometric amounts of organic compounds which comprise at least two groups which are capable of reacting with isocyanate groups. Compounds which contain a total of at least two amino groups and/or hydroxyl groups and which have a number average molecular weight of 300 to 10,000, preferably 400 to 6000, are preferably used as such. The corresponding polyhydroxyl compounds are preferably used, e.g. the hydroxypolyesters, hydroxypolyethers and/or acrylate resins containing hydroxyl groups which are known in the art in polyurethane chemistry.

In these known prepolymers, the ratio of isocyanate groups to hydrogen atoms which are reactive towards NCO corresponds to 1.05 to 10:1, preferably 1.1 to 3:1, wherein the hydrogen atoms preferably originate from hydroxyl groups. Moreover, the type and quantitative ratios of the starting materials used for the production of the NCO prepolymers are preferably selected so that the NCO prepolymers have an average NCO-functionality of 0.5 to 4, preferably 1.2 to 3, and a number average molecular weight of 500 to 10,000, preferably 800 to 4000.

It is also possible to use copolymers of the vinylically unsaturated monoisocyanate dimethyl-m-isopropenylbenzyl isocyanate, such as those which are described, amongst other features, DE-A-41 37 615.

The isocyanate groups of the polyisocyanates which are used are optionally partially capped. Customary capping agents can be used, e.g. 1,2-propanediol, dimethyl malonate, diethyl malonate, ethyl acetoacetate and/or butanone oxime, as well as other capping agents which are familiar to one skilled in the art.

Other suitable capping agents include compounds which contain only a single amine, amide, imide, lactam, thio or hydroxyl group. Examples include aliphatic or cycloaliphatic alcohols such as n-butanol, isopropanol, tert.-butanol, furfurol, 2-ethylhexanol and cyclohexanol, phenols; cresol, tert.-butylphenols, dialkylamino alcohols such as dimethylaminoethanol, oximes such as methyl ethyl ketoxime, acetone oxime, cyclohexanone oxime or acetophenone oxime, lactams such as epsilon-caprolactam or pyrrolidone-2, imides such as phthalimide or N-hydroxymaleinimide, hydroxyalkyl esters, hydroxamic acids and esters thereof, N-alkylamides such as methylacetamide, imidazoles such as 2-methylimidazole, and pyrazoles such as 2,3-dimethylpyrazole. Mixtures of these capping agents can also be used, however.

The molar ratio of the capping agents which contain acidic hydrogen to the NCO groups of the isocyanates can be varied, for example from 0.1 to 0.5:1.

The reaction of the fundamental constituents with polyisocyanates is preferably conducted, for example, by placing a melt or an organic solution of the fundamental constituents in aprotic solvents in the reaction vessel and treating it drop-wise at elevated temperatures, for example at 80° C., with the polyisocyanate, which is optionally dissolved in organic solvents. The course of the reaction is monitored via the NCO content. The reaction is allowed to proceed to an NCO content of <0.1%, for example. After the reaction is complete, the resulting emulsifier can be freed from the organic solvent, if necessary, by distillation, and can be diluted with water. Examples of solvents which can be used include organic solvents such as aliphatic and aromatic hydrocarbons, for example xylene, mixtures of aliphatic and/or aromatic hydrocarbons, esters or ethers. The reaction is preferably conducted in the absence of solvent. If the fundamental constituents contain water from their production process, this should be substantially removed, down to a maximum content of 2% for example, before the reaction with polyisocyanates. Suitable dehydration methods are familiar to one skilled in the art, e.g. azeotropic dehydration using an entraining agent such as xylene for example, distillative drying, freeze-drying, the use of drying agents, etc. In order to suppress the effect of basic catalysts which may be contained, and which may originate from the production process for the fundamental constituents, it may be useful to neutralise them by the addition of organic or inorganic acids, such as acetic acid and/or phosphoric acid for example. The molecular weights are increased by the reaction according to the invention of the fundamental constituents with di, tri- or polyisocyanates. The molecular weights of the emulsifiers produced are within the Mw range (weight average molecular weight) from 20,000 to 150,000.

The emulsifiers according to the invention are suitable for the emulsification of very different binder vehicles. The binder vehicles may be free from functional groups and may be binder vehicles which dry purely by physical action, or they may comprise functional groups. Functionalised binder vehicles may be self-crosslinking or externally crosslinkable. In the case of externally crosslinkable binder vehicles, the binder vehicle and crosslinking agent may either exist together over an extended period of time (single-component formulation), or are not mixed until just before application (two-component formulation). The binder vehicle and crosslinking agent may both be emulsified using the emulsifier according to the invention, but it is also possible to stabilise one of the two components in another manner, e.g. ionically, or for one component to be used in anhydrous form, so that this component does not require an emulsifier.

Examples of binder vehicles which can be emulsifed by the emulsifier according to the invention include polyurethanes, polyesters, polyethers, polyester poly(meth) acrylates or poly(meth)acrylates, as well as mixtures of these binder vehicles. The binder vehicles may, for example, be hydroxyl-, carboxyl-, epoxy-, amino- or acryloyl-functional, and/or may comprise acidic CH groups. A combination of different functional groups is also possible.

Examples of hydroxyl-functional binder vehicles include polyether polyols, polyacetal polyols, polyesteramide polyols, polyamide polyols, epoxy resin polyols or reaction products thereof with CO, phenolic resin polyols, polyurea polyols, polyurethane polyols, cellulose ester and ether polyols, partially saponified homo- and copolymers of vinyl esters, partially acetalated polyvinyl alcohols, polycarbonate polyols, polyester polyols, polyester poly(meth)acrylic polyols or poly(meth)acrylic polyols. Polyether polyols, polyester polyols, polyester poly(meth)acrylic polyols, poly(meth)acrylic polyols and polyurethane polyols are preferred. Polyols of this type, which can also be used in admixture, are described, for example, DE-OS 31 24 784.

Examples of polyurethane polyols are those which are produced by the reaction of di- and polyisocyanates with an excess of di- and/or polyols. Examples of suitable isocyanates include hexamethylene diisocyanate, isophorone diisocyanate and toluene diisocyanate, as well as isocyanates which are formed from three moles of a diisocyanate such as hexamethylene diisocyanate or isophorone diisocyanate and biurets which result from the reaction of three moles of a diisocyanate with one mole of water. Other isocyanates which can be used have already been described in the text.

Suitable polyurea polyols can be obtained in a similar manner by the reaction of di- and polyisocyanates with equimolar amounts of amino alcohols, e.g. ethanolamine or diethanolamine.

Examples of polyester polyols are the known condensation polymers of di- or polycarboxylic acids or the anhydrides thereof, namely phthalic anhydride, adipic acid etc., with polyols such as ethylene glycol, trimethylolpropane, glycerol etc.

Suitable polyamide polyols can be obtained in a similar manner to the polyesters, by replacing the polyols, at least in part, by polyamines such as isophorone diamine, hexamethylene diamine, diethylene triamine, etc.

Examples of poly(meth)acrylate polyols or polyvinyl compounds which contain OH groups include the known copolymers of (meth)acrylic acid esters containing hydroxyl groups, or of vinyl alcohol, and other vinyl compounds, such as styrene or esters of (meth)acrylic acid.

Examples of polyesterpoly(meth)acrylic polyols include poly(meth)acrylates which are synthesised in the presence of one or more polyester resins. Suitable (meth)acrylic monomers are described in the description given below of COOH-functional (meth)acrylate polyols.

Hydroxyl-functional binder vehicles are capable of reacting all crosslinking agents which are able to react with OH groups. Examples of crosslinking agents such as these include polyisocyanates, such as those which have already been described when dealing with the reaction of the fundamental constituents with polyisocyanates, blocked polyisocyanates, transesterification crosslinking agents such as the reaction products of polyisocyanates with ethyl acetoacetate or diethyl malonate, the reaction products of ethyl acetoacetate with polyols, tris(alkoxycarbonylamino) triazine, and amine resins. Examples of melamine resins include methyl-etherified melamine resins, such as the commercial products Cymel 325, Cymel 327, Cymel 350, Cymel 370 and Maprenal MF 927.

Other examples of melamine resins which can be used include butanol- or isobutanol-etherified melamines, such as the commercial products Setamin US 138 or Maprenal MF 610 for example; mixed-etherified melamine resins which are etherified both with butanol and with methanol, such as Cymel 254 for example, as well as hexamethyl-oxymethylmelamine (HMM melamine) e.g. Cymel 301 or Cymel 303, wherein the latter may require an external acidic catalyst for crosslinking, such as p-toluenesulphonic acid, which may optionally be ionically or non-ionically blocked with amines or polyepoxides.

Examples of carboxy-functionalised binder vehicles include carboxy-functionalised poly(meth)acrylic copolymers and/or carboxy-functionalised polyesters or polyurethanes.

During the production of the poly(meth)acrylic copolymers or polyesters which contain carboxyl groups, the carboxyl groups can be incorporated directly by using constituents containing carboxyl groups, for example during the synthesis of polymers such as (meth)acrylic copolymers. Examples of suitable monomers which contain carboxyl groups and which can be used for this purpose include unsaturated carboxylic acids, such as acrylic, methacrylic, itaconic, crotonic, isocrotonic, aconitic, maleic and fumaric acids for example, half esters of maleic and fumaric acids, and also β-carboxyethyl acrylate and addition products of hydroxyalkyl esters of acrylic acid and/or methacrylic acid with carboxylic acid anhydrides, such as phthalic acid-mono-2-methacryloyl-oxyethylester for example.

However, during the production of these (meth)acrylic copolymers, polyurethanes or polyesters which contain carboxyl groups it is also possible firstly to synthesise a polymer which contains hydroxy and optionally carboxyl groups and completely or partially to introduce the carboxyl groups in a second step by the reaction of the polymers which contain hydroxyl and optionally carboxyl groups with carboxylic acid anhydrides.

Carboxylic acid anhydrides which are suitable for addition to the polymers which contain hydroxyl groups are the anhydrides of aliphatic, cycloaliphatic and aromatic, saturated and/or unsaturated di- and polycarboxylic acids, such as the anhydrides of phthalic acid, tetrahydrophthalic acid, hexahydrophthalic acid, succinic acid, maleic acid, itaconic acid, glutaric acid, trimellitic acid and pyromellitic acid, as well as halogenated or alkylated derivatives thereof Anhydrides of phthalic acid, tetrahydro- and hexahydrophthalic acid and 5-methylhexahydrophthalic anhydride are preferably used.

Examples of hydroxyalkyl esters of α,β-unsaturated carboxylic acids which comprise primary hydroxyl groups and which are suitable for the production of hydroxy-functional poly(meth)acrylates include hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. 2-hydroxypropyl acrylate, 2-hydroxybutyl acrylate, 3-hydroxybutyl acrylate and the corresponding methacrylates can be cited as examples of hydroxyalkyl esters comprising a secondary hydroxyl group which can be used.

The hydroxyl-functionalised component may advantageously consist, at least in part, of a reaction product of one mole hydroxyethyl acrylate and/or hydroxyethyl methacrylate and on average two moles of epsilon-caprolactone. A reaction product of acrylic acid and/or methacrylic acid with the glycidyl ester of a carboxylic acid comprising a tertiary α-carbon atom can also be used, at least in part, as the hydroxy-functionalised component. Glycidyl esters of strongly branched monocarboxylic acids are obtainable under the trade name "Cardura E". The reaction of acrylic acid or methacrylic acid with the glycidyl ester of a carboxylic acid comprising a tertiary α-carbon atom can be effected before, during or after the polymerisation reaction.

During the production of the (meth)acrylic copolymers, further ethylenically unsaturated monomers can also be used in addition to the aforementioned monomers. The selection of these further ethylenically unsaturated monomers is not critical. It simply has to be ensured that the incorporation of these monomers does not result in unwanted properties of the copolymer.

Substances which are particularly suitable as a further ethylenically unsaturated component include alkyl esters of acrylic and methacrylic acid, such as methyl (meth)acrylate, ethyl (meth)acrylate, propyl (meth)acrylate, butyl (meth) acrylate, isopropyl (meth)acrylate, isobutyl (meth)acrylate, pentyl (meth)acrylate, hexyl (meth)acrylate, cyclohexyl (meth)acrylate, 2-ethylhexyl (meth)acrylate, octyl (meth) acrylate, 3,5,5-trimethylhexyl (meth)acrylate, decyl (meth) acrylate, dodecyl (meth)acrylate, hexadecyl (meth)acrylate, octadecyl (meth)acrylate and octadecenyl (meth)acrylate. Other ethylenically unsaturated monomers can be used instead of the aforementioned alkyl esters of acrylic and methacrylic acid or together with these alkyl esters for the production of (meth)acrylic copolymers, wherein the selection of these monomers substantially depends on the desired properties of the coating media as regards hardness, elasticity, compatibility and polarity.

Examples of other suitable ethylenically unsaturated monomers include the alkyl esters of maleic, fumaric, tetrahydrophthalic, crotonic, isocrotonic, vinylacetic and itaconic acids, such as the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters for example.

A monovinyl aromatic compound is another suitable component. This preferably contains 8 to 10 carbon atoms per molecule. Examples of suitable compounds include styrene, vinyltoluenes, $\alpha$-methylstyrene, chlorostyrenes, o-, m- or p-methylstyrene, 2,5-dimethylstyrene, p-methoxystyrene, p-tert.-butylstyrene, p,m-dimethylaminostyrene, p-acetamidostyrene and m-vinylphenol. Vinyltoluenes, and styrene in particular, are preferably used.

The polyesters which contain carboxyl groups can be synthesised by the usual methods (see, for example, B. Vollmert, Grundriβ der makromolekularen Chemie, E. Vollmert-Verlag Karlsruhe 1982, Volume II, page 5 et seq.) from aliphatic and/or cycloaliphatic di-, tri- or polyhydric alcohols, optionally together with monohydric alcohols, and aliphatic, aromatic and/or cycloaliphatic carboxylic acids as well as polybasic polycarboxylic acids. Examples of suitable alcohols include ethylene glycol, 1,2-propanediol, 1,3-propanediol, 2,2-dimethyl-1,3-propanediol, 1,2-butanediol, 1,3-butanediol, 1,4-butanediol, 1,5-pentanediol, 3-methyl-1, 5-pentanediol, 1,6-hexanediol, 2-ethyl-1,6-hexanediol, 2,2, 4-trimethyl-1,6-hexanediol, 1,4-dimethylolcyclohexane, glycerol, trimethylethane, trimethylolpropane, pentaerythritol, etherification products of diols and polyols, e.g. di- and triethylene glycol, polyethylene glycol, and neopentyl glycol esters of hydroxypivalic acid.

Examples of suitable carboxylic acids include adipic, azelaic, 1,3- and 1,4-cyclohexane-dicarboxylic acids, tetrahydrophthalic, hexahydrophthalic, endomethyltetrahydrophthalic acid, isophthalic acid, o-phthalic acid, terephthalic acid or anhydrides thereof, as well as derivatives thereof which are capable of esterification.

Examples of carboxyl-functional polyurethanes are those which result from the reaction of di- and polyisocyanates with an excess of di-and/or polyols and hydroxycarboxylic acids; dimethylolpropionic acid is a particularly suitable hydroxycarboxylic acid. Examples of suitable isocyanates include hexamethylene diisocyanate, isophorone diisocyanate and toluene diisocyanate, and also isocyanates which are formed from three moles of a diisocyanate such as hexamethylene diisocyanate or isophorone diisocyanate, and biurets which are formed from the reaction of three moles of a diisocyanate with one mole of water.

The carboxyl-functional binder vehicles can be crosslinked with the crosslinking agents for compounds containing carboxyl groups which are familiar to one skilled in the art. Examples of crosslinking agents such as these include epoxy-functional binder vehicles, which are also described in more detail below, and amine resins, such as those which have already been described as crosslinking agents for hydroxyl-functional binder vehicles.

Examples of epoxy-functional binder vehicle include di- or poly-functional epoxy compounds which are prepared by the use of di- or poly-functional epoxy compounds, such as diglycidyl or polyglycidyl ethers of (cyclo)aliphatic or aromatic hydroxy compounds such as ethylene glycol, glycerol, 1,2- and 1,4-cyclohexanediol, bisphenols such as bisphenol A, polyglycidyl ethers of phenol-formaldehyde novolacs, polymeric ethylenically unsaturated compounds which contain epoxy groups, such as glycidyl (meth)acrylate, N-glycidyl (meth)acrylate and/or allyl glycidyl ether, optionally copolymerised with various other ethylenically unsaturated monomers, glycidyl ethers of fatty acids comprising 6 to 24 C atoms, epoxidised polyalkanedienes such as epoxidised polybutadiene, hydantoin-epoxy resins, resins containing glycidyl groups resins, such as polyesters or polyurethanes which contain one or more glycidyl groups per molecule, and mixtures of said resins and compounds.

Crosslinking of the resins which contain carboxyl groups by epoxy-functional components may optionally in addition be catalysed with catalysts, which are used in an amount between 0.1% and 10% with respect to the total solid resin content.

Examples of catalysts such as these include phosphonium salts such as benzyl-triphenylphosphonium acetate, chloride, bromide or iodide, or ammonium compounds such as tetraethylammonium chloride or fluoride.

Epoxy-functional binder vehicles can also be crosslinked with other crosslinking agents familiar to one skilled in the art, e.g. with amino-functional components, in addition to the carboxyl-functional components described above.

Examples of amino-functional components include polyamines comprising at least two functional groups of formula RHN, wherein R may be a hydrogen atom or a straight or branched alkyl radical comprising 1 to 10 carbon atoms or a cycloalkyl radical comprising 3 to 8, preferably 5 or 6, carbon atoms.

Suitable polyamines include diamines and polyamines comprising at least two amino groups, wherein the amino groups may be primary and/or secondary. In addition, suitable polyamines include addition products which consist of polyamines comprising at least two primary amino groups and at least one, preferably one, secondary amino group with epoxy compounds, polyisocyanates and acryloyl compounds. Moreover, aminoamides and addition products of carboxy-functionalised acrylates and amines which comprise at least two amino groups are also suitable.

Examples of suitable di- and polyamine are described, for example, EP-A-0 240 083 and EP-A-0 346 982. Examples thereof include aliphatic and/or cycloaliphatic amines which comprise 2 to 24 C atoms and which contain 2 to 10 primary amino groups, preferably 2 to 4 primary amino groups, and 0 to 4 amino groups.

Representative examples thereof include ethylenediamine, propylenediamine, butylene-diamine, pentamethylenediamine, hexamethylenediamine, 4,7-dioxadecane-1,10-diamine, 1,2-diaminocyclohexane, 1,4-diaminocyclohexane, isophoronediamine, diethylenetriamine, dipropylenetriamine and 2,2-bis-(4-aminocyclohexyl)propane; polyether-polyamines, e.g. those with the trade name Jeffamine supplied by the Jefferson Chemical Company, bis-(3-aminopropyl)ethylamine, 3-amino-1-(methylamino)-propane and 3-amino-1-(cyclohexyl-amino)propane.

Polyamines which are also suitable are the customary polyamines based on addition products of poly-functional amine components with di- or poly-functional epoxy compounds, for example those which are produced using di- or poly-functional epoxy compounds, such as diglycidyl- or polyglycidyl ethers of (cyclo)aliphatic or aromatic hydroxy compounds such as ethylene glycol, glycerol, 1,2- and 1,4-cyclohexanediol, bisphenols such as bisphenol A, polyglycidyl ethers of phenol-formaldehyde novolacs, polymers of ethylenically unsaturated monomers which contain epoxy groups, such as glycidyl (meth)acrylate, N-glycidyl (meth) acrylamide and/or allyl glycidyl ether, optionally copolymerised with various other ethylenically unsaturated monomers, glycidyl ethers of fatty acids comprising 6 to 24 C atoms, epoxidised polyalkanedienes such as epoxidised polybutadiene, hydantoin-epoxy resins, resins containing glycidyl groups, such as polyesters or polyurethanes which contain one or more glycidyl groups per molecule, and mixtures of said resins and compounds.

The addition of the polyamines to said epoxy compounds occurs with ring opening of the oxirane grouping. The reaction can be conducted within a temperature range of 20 to 100° C., for example, but is preferably conducted between 20 and 60° C. The reaction may optionally be catalysed with 0.1 to 2% by weight of a Lewis base such as triethylamine or an ammonium salt such as tetrabutylammonium iodide. Polyamine-isocyanate addition products are also suitable polyamines. Customary isocyanates for polyamine-isocyanate addition products include aliphatic, cycloaliphatic and/or aromatic di-, tri- or tetraisocyanates, which may be ethylenically unsaturated. Examples thereof include 1,2-propylene diisocyanate, trimethylene diisocyanate, tetramethylene diisocyanate, 2,3-butylene diisocyanate, 1,6-hexamethylene diisocyanate, 2,2,4-trimethylhexamethylene diisocyanate, 2,4,4-trimethylhexamethylene diisocyanate, omega,omega'-dipropylether diisocyanate, 1,3-cyclopentane diisocyanate, 1,2- and 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane-4,4'-diisocyanate, toluene diisocyanate, 1,3-bis-(1-isocyanato-1-methyl-ethyl)benzene, 1,4-bis(1-isocyanato-1-methylethyl) benzene, 4,4'-diisocyanatodiphenyl, 3,3'-dichloro-4,4'-diisocyanatodiphenyl, addition products of 2 moles of a diisocyanate, e.g. hexamethylene diisocyanate or isophorone diisocyanate, to one mole of a diol, e.g. ethylene glycol, the addition product of 3 moles hexamethylene diisocyanate to 1 mole water (obtainable under the trade name Desmodur N from Bayer AG), the addition product of 1 mole trimethylolpropane and 3 moles toluene diisocyanate (obtainable under the trade name Desmodur L from Bayer AG) and the addition product of 1 mole trimethylolpropane and 3 moles isophorone diisocyanate.

The addition of polyamines to said isocyanate compounds is effected within a temperature range of 20 to 80° C., for example, preferably 20 to 60° C. The reaction may optionally be catalysed by the addition of 0.1 to 1% by weight of a tertiary amine such as triethylamine and/or 0.1 to 1% by weight of a Lewis acid, dibutyltin laurate.

As mentioned above, these polyamines may also be addition products with acryloyl compounds. Examples of di- or poly-functional acryloyl-unsaturated compounds for the preparation of polyamine addition products are described in U.S. Pat. No. 4,303,563, e.g. ethylene glycol diacrylate, diethylene glycol diacrylate, trimethylene glycol diacrylate, 1,3-butylene glycol diacrylate, 1,6-hexamethylene glycol diacrylate, trimethylol-propane triacrylate, pentaerythritol tetraacrylate and pentaerythritol triacrylate. Other examples of poly-functional acryloyl-unsaturated compounds which can be used include:

1. Urethane acrylates obtained by the reaction of an isocyanate group of a polyisocyanate with a hydroxyacrylate, e.g. hexamethylene diisocyanate and hydroxyethyl acrylate; this preparation is described in U.S. Pat. No. 3,297,745.
2. Polyether acrylates obtained by the transesterification of a hydroxy-terminated polyether with acrylic acid, as described in U.S. Pat. No. 3,380,831.
3. Polyester acrylates obtained by the esterification of a polyester, which contains hydroxyl groups, with acrylic acid, as described in U.S. Pat. No. 3,935,173.
4. Poly-functional acrylates obtained by the reaction of a hydroxyl-functionalised acrylates, such as hydroxyethyl acrylate for example, with
   a) dicarboxylic acids comprising 4 to 15 C atoms,
   b) polyepoxides comprising terminal glycidyl groups,
   c) polyisocyanates comprising terminal isocyanate groups, as described in U.S. Pat. No. 3,560,237.
5. Acrylate-terminated polyesters obtained by the reaction of acrylic acid, a polyol comprising at least two hydroxy functions, and a dicarboxylic acid, as described in U.S. Pat. No. 3,567,494.
6. A polyacrylate obtained by the reaction of acrylic acid with an epoxidised oil containing epoxide functions, such as soya oil or linseed oil, as described in U.S. Pat. No. 3,125,592.
7. A polyacrylate obtained by the reaction of acrylic acid with the epoxide groups of a diglycidyl ether of bisphenol A, as described in U.S. Pat. No. 3,373,075.
8. A polyacrylate obtained by the reaction of acrylic acid with an epoxide-functionalised vinyl polymer, e.g. polymers comprising glycidyl acrylate or vinyl glycidyl ether, as described in U.S. Pat. No. 3,530,100.
9. A polyacrylate obtained by the reaction of acrylic anhydride with polyepoxides, as described in U.S. Pat. No. 3,676,398.
10. Acrylate-urethane esters obtained by the reaction of a hydroxyalkyl acrylate with a diisocyanate and a hydroxyl-functionalised alkyd resin, as described in U.S. Pat. No. 3,676,140.
11. Acrylate-urethane polyesters obtained by the reaction of a polycaprolactone diol or triol with an organic polyisocyanate and with a hydroxyalkylacrylate, as described in U.S. Pat. No. 3,700,634.
12. A urethane polyacrylate obtained by the reaction of a hydroxy-functionalised polyester with acrylic acid and a polyisocyanate, as described in U.S. Pat. No. 3,759,809.

The terminal acryloyl groups of the di- or polyacrylic monomers or of the polyacrylates of examples 1 to 12 can be functionalised with polyamines. The addition reaction can be conducted within a temperature range of 20 to 100° C., for example, preferably at 40 to 60° C.

Another method of synthesising an amine-functionalised hardener is described in EP-A-0 2801. Acrylic acid ester copolymers are amidised with diamines here with the elimination of alcohol. The acrylic acid ester copolymer has a number average molecular weight Mn of 1000 to 10,000, preferably 1000 to 5000. Examples of possible comonomers include esters of (meth)acrylic acid, such as methyl, ethyl, butyl or cyclohexyl (meth)acrylate, hydroxyethyl (meth)acrylate and hydroxypropyl (meth)acrylate, as well as (meth)acrylic acid, styrene and vinyltoluene. Methyl acrylate is particularly preferred, since this monomer is readily accessible to aminolysis. The proportion of methyl acrylate to copolymer is 2 to 35% by weight. Copolymers are produced by solution polymerisation in customary solvents such as toluene, xylene, acetates e.g. butyl acetate or ethyl glycol acetate, ethers such as tetrahydrofuran, or mixtures of aromatic compounds such as the commercial product Solvesso 100. The synthesis of these copolymers is known to one skilled in the art and requires no further explanation. The polyamines which are used for aminolysis must contain at least two primary or secondary amine groups and have already been described above.

Other amine-functional compounds occur as reaction products from the reaction of a (meth)acrylic acid copolymer with alkylene imines, such as those which are described in EP-A-0 179 954. Apart from (meth)acrylic acid, the copolymer may contain esters of (meth)acrylic acid or vinyl compounds such as styrene. The comonomers which can be used have already been described under the definition of poly(meth)acrylates which contain hydroxyl groups. Examples of alkylene imines include propylene- or butylene imine.

Examples of polyamines which can also be used as hardeners according to the invention also include those which are produced by the reaction of copolymers of α-dimethyl-m-isopropenylbenzyl isocyanate (TMI), which have a number average molecular weight (Mn) of 1000 to 10,000, with mono- or diketimines which contain either an OH or a sec.-NH grouping.

All customary vinylically copolymerisable monomers without OH functionality can be selected for use as comonomers for the production of TM copolymers, such as esters of (meth)acrylic acid e.g. methyl, ethyl, butyl, isobutyl, ethylhexyl, cyclohexyl and/or lauryl (meth)acrylate, as well as styrene, vinyltoluene and/or methylstyrene. The copolymers are produced by customary radical solution polymerisation, as is known to one skilled in the art. Polymerisation is conducted, for example, in aprotic organic solvents, e.g. toluene and xylene, and in esters e.g. butyl acetate.

In general, all the customary radical initiators, such as peroxide and azo compounds, are used for this purpose. Reaction is effected by heating to temperatures of 80 to 140° C., for example.

Monomeric TMI can be polymerised within a range of 2 to 40% by weight with respect to the weight of all the monomers, but is preferably polymerised within a range of 2 to 25% by weight.

The isocyanate-terminated copolymer is subsequently reacted with one or more OH- or sec.-NH-functionalised mono- and/or diketene imines and/or mono- and/or dialdimines.

Production of the ketimines and/or aldimines (the expression "ketimines" is employed hereinafter for reasons of simplification, but also includes aldimines) is effected, for example, by the reaction of alkanolamines or di- or triamines which comprise at least one primary amino group, and which in the case of di- or triamines additionally comprise a secondary amine function, with aldehydes and/or ketones with the elimination of water.

Examples of alkanolamines include: monoethanolamine, monopropanolamine, mono-hexanolamine or 2-amino-2-hydroxy-propane.

Examples of di- or triamines which comprise at least one primary amino group and one secondary amino group include: N-methylpropylamine, diethylenetriamine, dipropylenetriamine or bishexamethyltriamine.

The primary amino groups of the aforementioned amines must be blocked for the production of the TMI acrylate/ketimine addition products. In this respect, the primary amines are reacted with aldehydes or ketones, with the elimination of water, to form Schiff bases. Examples of aldehydes and ketones such as these include: $C_3$–$C_{10}$ compounds such as hexylaldehyde, octylaldehyde, diisopropyl ketone and/or methyl isobutyl ketone. The two latter compounds are particularly preferred, because they only exhibit a slight tendency to undergo secondary reactions.

The OH- or sec.-NH-functionalised mono- or diketimines are preferably used in excess during the addition to the isocyanate-terminated copolymer; 90 to 95% of the isocyanate groups are preferably reacted with OH or NH groups. The remaining excess isocyanate groups are urethanised with monoalcohols such as ethanol, propanol or butanol in a final reaction step.

For the synthesis of ketimines or aldimines, i.e. of polyamines, for example, an alkanolamine or a di- or triamine, which comprises at least one primary amine function and also a secondary amine function, is placed in the reaction vessel, with the desired aldehyde or ketone blocking agent, in an organic solvent which forms an azeotropic mixture with water. The water of reaction which is formed is distilled off azeotropically by heating this mixture. The preparation is advantageously conducted under inert gas. The blocking agent may be used in excess, and can be distilled off following the reaction. It is advisable to select, as the capping agent, a ketone/aldehyde which itself forms an azeotrope with water, so that the use of an additional organic solvent can be avoided.

For the addition of the OH- or sec.-NH-functionalised ketimine or aldimine to the isocyanate-terminated TMI copolymer, the ketimine is placed in the reaction vessel, e.g. at 80° C., under inert gas, and the copolymer is added over two hours, for example. The reaction may optionally be catalysed, by means of a Lewis acid such as dibutyltin laurate for example. After the addition of the copolymer is complete, and provided that a deficit of the ketimine is present, an alcohol e.g. butanol is added. The batch is optionally stirred further at elevated temperature, e.g. for about 10 to 30 minutes.

The above method of preparation merely constitutes one example of a procedure. The reaction may also be conducted by placing the copolymer in the reaction vessel and adding the ketimine.

It may be advisable to react the terminal amine groups of said polyamines with aldehydes or ketones, with the elimination of water, to form Schiff bases or aldimines or ketimines. The procedure employed for this purpose is analogous to the aldimine or ketimine synthesis described above. Amino-functional binder vehicles can be crosslinked with acryloyl-functional resins, epoxy-functional resins, aceteoacetic ester-functional resins and with other customary crosslinking agents for amino-functional binder vehicles which are familiar to one skilled in the art. Examples of acryloyl-functional components have already been described during the explanation of the formation of addition products from polyamines and acryloyl compounds. Acryloyl-functional binder vehicles such as these are capable of reacting with the crosslinking agents familiar to one skilled in the art. Examples of crosslinking agents such as these include acidic CH crosslinking agents. It is also possible to effect crosslinking by a radical mechanism, for example oxidative crosslinking in the presence of unsaturated fatty acids, crosslinking by electron beam, UV crosslinking, or hardening by a radical mechanism in the presence of thermally cleavable radical initiators.

Examples of acidic CH compounds include those which are prepared by the transesterification of an aliphatic β-ketocarboxylic acid ester with a polyol.

Examples of suitable β-ketocarboxylic acid esters include esters of acetoacetic acid or of an alkyl-substituted acetoacetic acid, such as α- and/or γ-methylacetoacetic acid. Suitable esters of these acids are those with aliphatic alcohols, preferably lower alcohols comprising 1 to 4 carbon atoms, such as methanol, ethanol or butanol.

Hydroxyl-functional binder vehicles and compounds such as those which have already been described under hydroxyl-functional compounds are suitable as polyols for reaction with the β-ketocarboxylic acid esters.

Synthesis of the acidic CH component can be effected via a plurality of steps, for example. After removing solvent which may possibly be present, the polyol is first transesterified with the aliphatic β-ketocarboxylic acid ester.

A procedure can be employed for the transesterification of the polyol, for example, in which the polyol, which is freed from solvent if necessary by applying a vacuum, is placed in the reaction vessel. The β-ketocarboxylic acid ester is then added in excess, by drop-wise addition for example. The reaction is effected at elevated temperature; the alcohol which is released is removed from the system.

It is also possible to add a catalyst to speed up the reaction. Examples of catalysts of this type include acids such as formic acid or p-toluenesulphonic acid. It is advantageous if the reaction temperature is continuously increased during the transesterification (for example in steps of 10° C./20 min.), until a temperature is reached which is just below (about 100° C.) the boiling point of the β-ketocarboxylic acid ester. After quantitative transesterification, the excess β-ketocarboxylic acid ester is removed, by applying a vacuum for example. The mixture can then be cooled and can be adjusted to the desired solids content with an inert solvent.

The binder vehicle may also contain 2-acetoacetoxy-ethyl methacrylate as a reactive thinner for adjusting the viscosity. The CH-acidity of acetoacetic ester-functionalised components can be increased by the reaction of the β-carbonyl groups with primary and/or secondary monoamines, as described in DE-A-39 32 517 for example.

The acidic CH binder vehicle optionally contains one or more catalysts mixed with it in the form of Lewis bases or Brönsted bases, wherein the conjugate acids of the latter have a pKA value of at least 10. Lewis bases have proved to be particularly suitable, such as those from the group comprising cycloaliphatic amines such as diazabicyclooctane (DABCO), tert.-aliphatic amines such as triethylamine, tripropylamine, N-methyldiethanolamine, N-methyldiisopropylamine or N-butyldiethanolamine, as well as amidines such as diaza-bicycloundecene (DBU), and guanidines such as N,N,N',N'-tetramethylguanidine for example. Other examples include alkyl- or aryl-substituted phosphanes such as tributylphosphane, triphenylphosphane, tris-p-tolylphosphane, methyldiphenylphosphane, as well as hydroxy- and amine-functionalised phosphane such as tris-hydroxy-methylphosphane and tris-dimethylamino-ethylphosphane for example. Examples of Brönsted bases which can be used include alcoholates such as sodium or potassium methylate, quaternary ammonium compounds such as alkyl-, aryl- or benzyl-ammonium hydroxides or halides, e.g. tetraethyl- or tetrabutylammonium hydroxide or fluoride, as well as trialkyl- or triarylphosphonium salts or hydroxides.

The amount of catalysts is 0.01 to 5% by weight for example, preferably 0.02 to 2% by weight, with respect to the total solids content of the binder vehicle.

Transesterification crosslinking agents which are capable of crosslinking with hydroxyl-functional compounds are those which contain at least two groups which are capable of transesterification. These crosslinking agents which are capable of transesterification are preferably substantially free from primary, secondary or tertiary amino groups, since the latter can have a negative effect on shelf life and resistance to light.

Examples of binder vehicles which are capable of transesterification include compounds which on average contain at least two groups in their molecule which are derived from methane-tricarboxylic acid monoamide units or from acetoacetic ester-2-carboxylic acid units.

Examples of suitable compounds include the reaction products of malonic acid diesters, such as malonic acid dimethyl, diethyl, dibutyl or dipentyl esters, or acetoacetic acid esters such as acetoacetic acid methyl, ethyl, butyl or pentyl esters, with polyisocyanates.

Examples of isocyanates of this type which can be used according to the invention are familiar to one skilled in the art. The same compounds can be used as those which have already been described for the reaction of the fundamental constituents with polyisocyanates. However, other compounds which are capable of transesterification and which are also suitable comprise the reaction products of esters and partial esters of polyhydric alcohols and malonic acid with monoisocyanates. Examples of polyhydric alcohols include dihydric to pentahydric alcohols such as ethanediol, the various propane-, butane-, pentane- and hexanediols, polyethylene- and polypropylene diols, glycerol, trimethylolethane and -propane, pentaerythritol, hexanetriol and sorbitol. Examples of suitable monoisocyanates include aliphatic isocyanates such as n-butyl isocyanate, octadecyl isocyanate, cycloaliphatic isocyanates such as cyclohexyl isocyanate, araliphatic isocyanates such as benzyl isocyanate, or aromatic isocyanates such as phenyl isocyanate.

Substances which are also suitable include the corresponding malonic esters of acrylic resins containing OH groups, polyesters, polyurethanes, polyethers, polyester amides and -imides and/or the reaction product of malonic acid half esters such as malonic acid monoethyl ester with aliphatic and aromatic epoxy resins, e.g. acrylate resins containing epoxide groups, glycidyl ethers of polyols such as hexanediol, neopentyl glycol, diphenylolpropane and -methane and hydantoins which contain glycidyl groups, as well as mixtures of these compounds.

Substances which are also preferred include hardener components which are obtained by the non-quantitative transesterification, with polyols, of compounds which contain more than two groups which are capable of transesterification in their molecule.

The aforementioned polyols may be a polyhydric alcohol which preferably contains 2 to 12, particularly 2 to 6 C atoms. Examples thereof include: ethylene glycol, propylene glycol-(1,2) and -(1,3), butylene glycol-(1,4) and -(2,3), di-β-hydroxyethylbutanediol, hexanediol-(1,6), octanediol-(1,8), neopentyl glycol, cyclohexanediol-(1,6), 1,4-bis-(hydroxymethyl)-cyclohexane, 2,2-bis-(4-hydroxycyclohexyl)-propane, 2,2-Bis-(4-(β-hydroxyethoxy)-phenyl)-propane, 2-methyl-1,3-propanediol, glycerol, trimethylolpropane, hexanetriol-(1,2,6), butanetriol-(1,2,4), tris-(β-hydroxyethyl) isocyanurate, trimethylol-ethane, pentaerythritol and hydroxyalkylation products thereof, as well as diethylene glycol, triethylene glycol, tetraethylene glycol, polyethylene glycols, dipropylene glycol, tripropylene glycol, polypropylene glycols, dibutylene glycol, polybutylene glycols and xylylene glycol. Polyesters can also be used which are obtained from or with lactones, e.g. epsilon-caprolactone, or from a hydroxycarboxylic acid such as hydroxypivalic acid, gamma-hydroxydecanoic acid, gamma-hydroxycaproic acid or thioglycolic acid.

Alternatively, the polyol may constitute an oligomeric or polymeric polyol compound (a polyol resin), the number average molecular weight Mn of which (as determined by means of gel chromatography using a polystyrene standard) is usually within the range of about 170 to 10,000, preferably about 500 to about 5000. In special cases, however, Mn can be 10,000 g/mole or more. Suitable oligomers/polymers include polymers, condensation polymers or polyaddition compounds. Their hydroxyl number is generally 30 to 250, preferably 45 to 200 and particularly 50 to 180 mg KOH/g. These compounds which contain OH groups may optionally also contain other functional groups, such as carboxyl groups.

Examples of polyols of this type include the hydroxyl-functional compounds which have already been described elsewhere.

Other examples of compounds which are capable of transesterification can be produced, for example, by the esterification of a polyepoxide with a dicarboxylic acid monoester which forms the group capable of transesterification, e.g. a malonic acid monoester. A component is obtained in this manner which comprises one group which is capable of transesterification for each epoxide group. Aromatic or aliphatic polyepoxides can be used here.

Further examples of suitable dicarboxylic acid monoesters include malonic acid monoalkyl esters and acetone-dicarboxylic acid monoalkyl esters wherein the alkyl radical may be straight-chained or branched with 1 to 6 atoms, e.g. methyl, ethyl, n-butyl or t-butyl.

Binder vehicles comprising acidic CH groups can be crosslinked with acryloyl-functional compounds in the sense of a Michael reaction.

The binder vehicles can be produced in customary solvents. It is advantageous if solvents are used which do not have an adverse effect later, during the production of the coating medium. It is also advantageous if the content of organic solvents is kept low.

The emulsifier can be provided with functional groups to improve its capacity for incorporation in crosslinking lacquer systems. Examples of functional groups such as these are the same groups which have already been described for functionalised binder vehicles, e.g. hydroxyl groups, carboxyl groups, epoxy groups, amino groups, acryloyl groups and acidic CH groups.

If the fundamental constituent is modified with a deficit of isocyanate, the modified emulsifier may still contain OH groups. If an excess of isocyanate is used, however, the modified emulsifier becomes isocyanate-functional. The newly introduced functional groups can therefore be bonded to the emulsifier either via the remaining hydroxyl groups or via the isocyanate groups.

If a further polyol is added during the reaction of the fundamental constituent with polyisocyanate, for example, this polyol can be bonded to the emulsifier via an urethane bond. Examples of suitable polyhydric alcohols include ethylene glycol, 1,2- and 1,3-propylene glycol, 1,3-, 1,4- or 2,3-butanediol, 1,6-hexanediol, 2,5-hexanediol, trimethyl-hexanediol, diethylene glycol, triethylene glycol, hydrogenated bisphenols, 1,4-cyclohexanediol, 1,4-cyclohexanedimethanol, neopentyl glycol, tricyclodecanediol, 1,4-butanediol, trimethylolpropane, glycerol, pentaerythritol, trimethylpentanediol, dipentaerythritol and mixtures of these or other polyhydric alcohols.

It is also possible to link polyester polyols, polyether polyols, etc., to the emulsifier via the urethane group.

Hydroxyl-functional emulsifiers are capable of reacting with all crosslinking agents which are able to react with OH groups. Examples of crosslinking agents such as these have already been described as crosslinking agents for hydroxyl-functional binder vehicles.

Carboxyl groups can be introduced into the emulsifier by the reaction of a hydroxyl-functional emulsifier such as that described above with polycarboxylic acids or anhydrides thereof Examples of suitable polycarboxylic acids (anhydrides) include phthalic acid (anhydride), isophthalic acid, terephthalic acid, tetrahydrophthalic acid (anhydride), hexahydrophthalic acid (anhydride), 1,3- and 1,4-cyclohexane-dicarboxylic acid, maleic acid (anhydride), succinic acid (anhydride), fumaric acid, adipic acid, sebacic acid, azelaic acid, dimeric fatty acids, trimeric fatty acids, trimellitic acid (anhydride), pyromellitic acid (anhydride) and mixtures of these or other acids. Aliphatic and cycloaliphatic dicarboxylic acids or anhydrides are preferred.

The reaction of the hydroxyl-functional emulsifiers with the polycarboxylic acids or anhydrides is conducted, for example, by mixing the hydroxyl-functional emulsifier, in the melt or in an aprotic solvent, with the polycarboxylic acid (anhydride) and reacting it, at 100 to 190° C. for example, until the desired acid number is reached. The same solvents can be used as those which have already been described for the reaction of the fundamental constituents with polyisocyanates.

The carboxyl-functional emulsifiers can be crosslinked with the crosslinking agents for compounds containing carboxyl groups which are familiar to one skilled in the art. Crosslinking agents such as these have already been described as crosslinking agents for carboxyl-functional binder vehicles.

Amino groups can also be introduced into the emulsifier via the polyisocyanate. For this purpose, the polyisocyanate is reacted, before, during or after the reaction with the fundamental constituent, with one or more OH- or sec.-NH-functionalised mono- and/or diketene imines and/or mono- and/or dialdimines. On conversion into the aqueous phase, the ketimines/aldimines hydrolyse and the amino groups become free. Another option is the reaction of acryloyl-functional emulsifiers with polyamines. Yet another possibility consists of reacting the polyisocyanates to a certain degree with the fundamental constituent and converting the isocyanate-functional emulsifier which is functionalised in this manner into the aqueous phase. Hydrolysis of the NCO groups then occurs to form amino groups, with the elimination of $CO_2$.

Epoxy groups can be introduced into the emulsifier by the reaction of hydroxyl-functional emulsifiers with epichlorohydrin, for example. Another possibility is the reaction of epoxypolyols with the polyisocyanates used for modification. This reaction can be effected before, during or after the reaction of the polyisocyanates with the fundamental constituents.

Acryloyl groups can be introduced into the emulsifier by the reaction of the polyisocyanate groups of the emulsifiers with hydroxyl-functional (meth)acrylic monomers. This reaction can be carried out before, during or after the reaction of the polyisocyanate with the fundamental constituents. Examples of hydroxyl-functional (meth)acrylates which can be used include monomers comprising primary and secondary hydroxy functions, such as those which have already been described. The reaction of the polyisocyanate with the hydroxyl-functional monomers is conducted, for example, by treating the polyisocyanate, in the absence of solvent or in an aprotic solvent, with the hydroxyl-functional monomer which is added drop-wise, and by reacting the batch at 40 to 80° C. for example until the desired NCO number is reached. The same solvents can be used as those which have already been described for the reaction of the fundamental constituents with polyisocyanates. It is also possible to place the hydroxyl-functional monomers in the reaction vessel together with the fundamental constituents and to react them jointly with the polyisocyanates, or to add the hydroxyl-functional monomers after partial reaction has occurred of the polyisocyanates with the fundamental constituents.

Acidic CH groups can be introduced into the emulsifier by various routes. Thus it is possible to react a hydroxyl-functional emulsifier with a β-ketocarboxylic acid ester such as ethyl acetoacetate, with transesterification. For example, the transesterification of the hydroxyl-functional emulsifier with a β-ketocarboxylic acid ester can be effected by placing the fundamental constituent in the reaction vessel and then adding the β-ketocarboxylic acid ester in excess, and drop-wise for example. The reaction is conducted at elevated temperature, and the alcohol which is released is removed from the system.

It is also possible to add a catalyst to speed up the reaction. Examples of catalysts of this type include acids such as formic acid or p-toluenesulphonic acid. It is advantageous if the reaction temperature is continuously increased during the transesterification (for example in steps of 10° C./20 min.), until a temperature is reached which is just below (about 100° C.) the boiling point of the β-ketocarboxylic acid ester. After quantitative transesterification, the excess β-ketocarboxylic acid ester is removed, by applying a vacuum for example. The mixture can then be cooled and can be adjusted to the desired solids content with an inert solvent.

It is also possible to introduce acidic CH groups by the reaction of polyisocyanates with acidic CH compounds such as ethyl acetoacetate or diethyl malonate. Modification with acidic CH groups can be effected before, during or after the reaction of the fundamental constituents with polyisocyanates. The reaction of the polyisocyanate groups of the emulsifiers with acidic CH compounds is conducted, for example, by treating the polyisocyanate-functional emulsifier, in the absence of solvent or in an aprotic solvent, with the acidic CH compound which is added drop-wise, and by reacting the batch at 60 to 100° C. for example until the desired NCO number is reached. The same solvents can be used as those which have already been described for the reaction of the fundamental constituents with polyisocyanates. It is also possible to react the acidic CH compounds with the polyisocyanates, or to add the acidic CH compounds after partial reaction has occurred of the polyisocyanates with the fundamental constituents. It is also advisable to catalyse the reaction with the acidic CH compounds. The catalysts which are used for the reaction of the polyisocyanates with acidic CH compounds are preferably alkali alcoholates such as lithium methanolate, or alkali hydroxides, for example alkali metal hydroxides such as lithium, sodium and/or potassium hydroxide. Anhydrous alkali metal hydroxides are preferably used. Lithium hydroxide is most preferably used. The catalysts are used in catalytic amounts, for example in amounts of 0.1 to 2% by weight, preferably 0.3 to 1% by weight, with respect to the weight of isocyanate and acidic CH component.

The catalysts are used in solid form, for example in pulverised form.

In principle, all customary methods which are known to one skilled in the art are suitable for preparing the emulsions, such as e.g. stirring processes with high-speed blade stirrers and dispersing discs (plain or toothed), rotor-stator units (Ultra-Turrax, Cavitron, Supratron, Siefer Trigonal machine, colloid mills), devices which operate with injection of the phase to be emulsified into the external phase or in which the two phases are brought into collision under high pressure and counter-current injection, ultrasonic homogenisers, high-pressure homogenisers and static mixers. Emulsification can be effected by the direct or by the inverse method, and may be carried out continuously or batch-wise. The preferred procedure is the continuous production of an emulsion using nozzle injection devices, high-pressure homogenisers, ultrasonic homogenisers and in-line rotor-stator homogenisers, in which the two phases are added to the homogeniser unit in a ratio of partial volume flows which corresponds to the final formulation. Direct emulsification using a continuous procedure with in-line rotor-stator machines (Cavitron) is particularly preferred. The construction and mode of operation of machines such as these are known to one skilled in the art. Rotor-stator machines can be equipped with slotted or perforated rings or with a combination of the two. In order to intensify the emulsification effect, part of the final amount of aqueous phase can first be omitted during the preparation of the emulsion, and is then added to the concentrate after emulsification is complete. This is effected either batch-wise in a supply tank, or preferably continuously by subsequently adding the amount of water which is still lacking to the homogenising unit or to one of the outer rotor-stator stages whilst the process is proceeding. One advantage of this procedure is that the emulsion concentrate is cooled, immediately after it is produced, to temperatures of 30° C. for example, at which there is no risk of the quality of the emulsion being impaired by the high temperatures which result from the shearing forces.

During emulsification, the emulsifiers according to the invention can either be used complete with the binder vehicle phase, complete with the aqueous phase, or distributed over both phases. For physical reasons which are known to one skilled in the art, they are preferably used with the aqueous phase or distributed over both phases.

EXAMPLES (All Parts are Given as Parts by Weight)

The OH-functional, solvent-free polyester Desmophen 670 (a commercial product of Bayer AG), which had an OH number of 142 mg KOH/g and an acid number of 2 mg KOH/g, was used as the binder vehicle.

Production of a Fundamental Constituent

Synthesis was effected analogously to a method described in U.S. Pat. No. 2,380,166 (examples 2 and 4 therein)

800 parts lauric acid and 782 parts sorbitol were heated to 250° C. over 70 minutes, with stirring and under an inert gas atmosphere, in a 4-litre three-necked flask fitted with a reflux condenser, thermometer and stirrer, in the presence of 5 parts sodium hydroxide solution, and the batch was maintained under these conditions for 5 hours. 30 parts activated carbon were then added and the batch was subsequently filtered. The resulting wax-like product had a theoretical OH number of 486 mg KOH/g. 346 parts of this product were melted and were introduced into an autoclave fitted with a stirrer. The batch was heated to 100° C. and 17 parts potassium methanolate were added. The batch was heated to 110° C. and 2200 parts liquid ethylene oxide were added drop-wise over a period of 150 minutes. The temperature was held within a range between 105° C. and 110° C. until all the ethylene oxide had reacted. The decrease of the pressure in the autoclave to normal pressure was employed as an indicator here. The product obtained was subsequently purified by steam distillation under vacuum (10 mm mercury) and with stirring. Finally, 30 parts activated carbon were added, and the batch was stirred for a further 15 minutes and filtered. The product obtained was wax-like and had a honey-yellow colour. Its number average molecular weights (GPC; polystyrene standard) was 2400; its weight average molecular weight was 3100. An OH number of 68 mg KOH/g was measured.

Example 1

Production of an isocyanate-chain lengthened emulsifier based on the fundamental constituent described above.

938 parts of the above fundamental constituent were melted at 60° C. in a 2-litre, four-necked flask fitted with a stirrer, reflux condenser, thermometer and dropping funnel. 62 parts isophorone diisocyanate were then continuously added at 60° C. to the melt over a period of 1 hour. The batch was heated to 80° C. and was stirred at this temperature until the NCO number had fallen to less than 0.1%. The product had an MW (weight average molecular weight) of 23,000 (GPC with polystyrene standard).

Use of the Emulsifiers
Batch-wise emulsification
General procedure 300 parts of the above binder vehicle were heated to 60° C. and were poured, with high-speed stirring (Getzmann Dispermat, 6-blade stirrer, diameter: 35 mm, peripheral speed: 14.7 m/sec at a speed of rotation of 8000 rpm), into 150 parts an aqueous solution of 27 parts emulsifier heated to 40° C., corresponding to 9% with respect to the resin phase. The addition had to be made so that the resin was poured "in a thin stream" on to the periphery of the stirrer. The stirrer was positioned so that the maximum turbulence was produced. After the addition was complete, the emulsion, which was still warm, was allowed to cool to room temperature with moderate stirring.

Comparative Example 1

Production of an emulsion using the above fundamental constituent; procedure as given above. The emulsion was not stable. The particle size could not be measured.

Comparative Example 2

Production of an emulsion using the above fundamental constituent. As in comparative example 1, except that the emulsifier content was increased from 9% to 15%.

The emulsion was not stable. Particle size: about 50–150 μm (determined microscopically).

Example 2

Production of an emulsion using a polymeric emulsifier according to example 1

Emulsifier from synthesis example 1; procedure as described above. The emulsion was stable. Particle size: 0.5–5 μm (determined microscopically).

Example 3

Continuous Production of an Emulsion

Composition of the Emulsion as in Example 2

Emulsification was effected using a CAVITRON in-line rotor-stator homogeniser equipped as follows:

| | |
|---|---|
| Rotor 1: blade wheel | Stator 1: slotted ring |
| Rotor 2: slotted ring | Stator 2: perforated ring; 1.5 mm holes |
| Rotor 3: perforated ring; 1.5 mm holes | |
| Rotor 4: perforated ring; 0.5 mm holes | Stator 3: perforated ring; 0.5 mm holes |

The speed of rotation was 6000 rpm, corresponding to a peripheral speed of 25 m/sec with respect to the outer rotor ring. The resin and aqueous phase were fed into the installation via metering pumps, at a ratio of 2:1 and at a total delivery rate of 30 kg/hour. The emulsifier from example 1 was distributed over both phases in a 1:1 ratio. The proportion thereof with respect to the resin phase was 9%. An installation pressure of about 1.5 bar was set by a pressure maintenance valve on the homogeniser inlet, in order to prevent the machine from drawing in material by suction during operation, independently of the volume flow which was predetermined by the metering pumps. The resin which contained emulsifier was heated to 70° C. The aqueous phase which contained emulsifier was at room temperature (23° C.). Directly after leaving the homogeniser, the emulsion was cooled to room temperature in a cooling section.

Particle size of the emulsion: 0.5–2.5 μm (determined microscopically).

Example 4

Continuous production of an emulsion; variant of example 3.

The procedure corresponded to that employed in example 3, except that an additional stator with 0.5 mm holes was installed, with the aim of adding the proportion of water by which the aqueous phase had previously been reduced for the purpose of a more effective transfer of shearing forces (corresponding to 15% of the total amount of water without emulsifier) to the finished emulsion concentrate at this point between rotor 4 and stator 4. By this means, heat was rapidly removed from the concentrate and any portions of emulsion of the "water-in-oil" type which were present were re-inverted to the "oil-in-water" type. Particle size of the emulsion: 0.5–1.5 μm (determined microscopically).

Assessment of the emulsions

| | Comparative examples | | Examples | | |
|---|---|---|---|---|---|
| | 1 | 2 | 2 | 3 | 4 |
| Particle size* | nm | 50–150 | 0.5–5 | 0.5–2.5 | 0.5–1.5 |
| | n.a. | n.a. | a. | a. | a. |

*in μm, determined microscopically
nm: not measurable
a.: acceptable
n.a.: not acceptable

We claim:

1. A non-ionic emulsifier comprising a urethane reaction product of at least two fatty acid esters of polyalkoxylated polyhydric alcohols and a polyisocyanate wherein the non-ionic emulsifier has a weight average molecular weight of from 20,000 to 150,000, and the residual isocyanate group content of the urethane reaction product is less than 0.1 percent.

2. An emulsifier according to claim 1, wherein the polyhydric alcohols are polyethoxylated and/or polypropoxylated.

3. An emulsifiers according to claim 1, wherein the polyhydric alcohols at least partially comprise glycerol and/or sorbitol.

4. A non-ionic emulsifier according to claim 1 comprising the urethane reaction product of two or more different fatty acid esters.

5. An emulsifier according to claim 1, wherein the fatty acid esters have the general formula

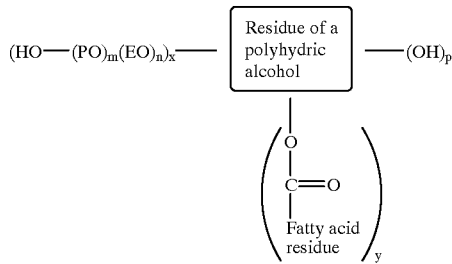

wherein EO denotes an ethoxyl unit and PO denotes a propoxyl unit, and the subscripts have the following meanings:

$x \geq 1$ $y \geq 1$ $p = 1-5$ $n = 0-300$ $m = 0-300$ $n+m \geq 25$.

6. A method of producing a non-ionic emulsifier comprising combining at least two fatty acid esters of polyalkoxylated polyhydric alcohols with a polyisocyanate to form a urethane reaction product wherein the nonionic emulsifier has a weight average molecular weight of from 20,000 to 150,000, and the residual isocyanate group content of the urethan reaction product is less than 0.1 percent.

7. A method according to claim 6, wherein the fatty acid esters have the general formula

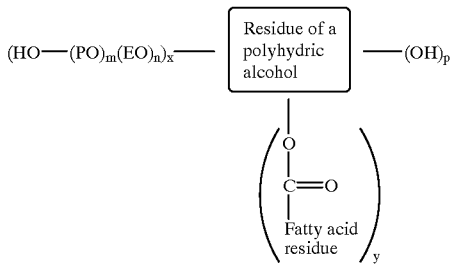

wherein EO denotes an ethoxyl radical and PO denotes a propoxyl radical, and the subscripts have the following meanings:

$x \geq 1$ $y \geq 1$ $p = 1-5$ $n = 0-300$ $m = 0-300$ $n+m \geq 25$.

* * * * *

UNITED STATES PATENT AND TRADEMARK OFFICE
CERTIFICATE OF CORRECTION

PATENT NO. : 6,063,954          Page 1 of 1
DATED      : May 16, 2000
INVENTOR(S) : Wolfgang Diener, Volker Duecoffre, Carmen Flosbach, Gerhard Hey, Walter Schubert It is certified that error appears in the above-identified patent and that said Letters Patent is hereby corrected as shown below:

Column 7,
Line 55, delete "trimethylethane" and insert -- trimethylolethane --, therefor.

Column 11,
Line 42, delete "TM" and insert -- TMI --, therefor.
Line 61, delete "diketene imines" and insert -- diketimines --, therefor.

Column 12,
Line 10, delete "bishexamethyltriamine" and insert -- bishexamethylenetriamine --, therefor.

Signed and Sealed this

Nineteenth Day of March, 2002

Attest:

JAMES E. ROGAN
Director of the United States Patent and Trademark Office

Attesting Officer